United States Patent
Samaras et al.

(10) Patent No.: US 8,236,250 B2
(45) Date of Patent: Aug. 7, 2012

(54) GAS TREATMENT DEVICE

(75) Inventors: Zissis Samaras, Panorama Thessaloniki (GR); Grigorios Koltsakis, Thessaloniki (GR)

(73) Assignee: Aristotle University Thessaloniki, Research Committee, Thessaloniki (GR), part interest ( * ) Notice: Subject to any disclaimer, the term of this patent is extended or adjusted under 35 U.S.C. 154(b) by 334 days.

(21) Appl. No.: 12/311,195

(22) PCT Filed: Sep. 20, 2007

(86) PCT No.: PCT/GR2007/000048
§ 371 (c)(1),
(2), (4) Date: Mar. 20, 2009

(87) PCT Pub. No.: WO2008/035127
PCT Pub. Date: Mar. 27, 2008

(65) Prior Publication Data
US 2010/0003171 A1 Jan. 7, 2010

(30) Foreign Application Priority Data
Sep. 20, 2006 (GR) .............................. 20060100530

(51) Int. Cl.
*B01D 50/00* (2006.01)
(52) U.S. Cl. ........................................ 422/177
(58) Field of Classification Search ............... 422/177, 422/179, 180; 55/523
See application file for complete search history.

(56) References Cited

U.S. PATENT DOCUMENTS

| | | | |
|---|---|---|---|
| 3,166,895 | A | 1/1965 | Slayter et al. |
| 4,175,107 | A | 11/1979 | Fukada et al. |
| 5,484,575 | A | 1/1996 | Steenackers |
| 2007/0000236 | A1* | 1/2007 | Naito et al. ............... 60/275 |
| 2007/0009400 | A1* | 1/2007 | Vakkilainen et al. ......... 422/171 |

FOREIGN PATENT DOCUMENTS

| | | |
|---|---|---|
| DE | 3910554 | 10/1989 |
| DE | 20 20050 10248 | 8/2006 |
| EP | 0317515 | 5/1989 |
| WO | WO 94/12777 | 6/1994 |
| WO | WO 01/94010 | 12/2001 |

* cited by examiner

*Primary Examiner* — Tom Duong
(74) *Attorney, Agent, or Firm* — James Creighton Wray

(57) ABSTRACT

Exhaust gas treatment is based on metal foams using catalytic coatings. A catalytic converter for diesel and gasoline engines includes oxidation catalysts, 3-way catalysts, de-NOx catalysts, NH3 slip catalysts. Foam high surface areas and high mixing rates enhance catalytic performance. Particulate filtration in both diesel and direct injection gasoline engines uses deep bed filtration. A multiple-pass radial flow uses more than one foam segments, separated by a diaphragm. Filtration, pressure drop and catalytic performance are enhanced using variable foam porosities in axial and radial flow directions and non-uniform catalyst coatings. More than one catalytic functionalities may be incorporated in a single shell. Secondary foam segments are placed within main foam segments. Diaphragms at the entrance and exit of the external shell allow the flow to be divided between the main and the secondary foam segments according to the respective flow resistances.

20 Claims, 2 Drawing Sheets

GAS TREATMENT DEVICE

This application claims the benefit of Greek Application No. 20060100530 filed Sep. 20, 2006 and PCT/GR2007/000048 filed Sep. 20, 2007, which are hereby incorporated by reference in their entirety.

FIELD OF THE INVENTION

The present invention relates to devices for gas treatment based on metal foams, in particular an exhaust gas after-treatment device, comprising a metal shell defining a cavity with an intake pipe and an outlet pipe and two foam segments made of layered metal foam sheets set in the path of communication between said intake pipe and outlet pipe.

BACKGROUND OF THE INVENTION

The metal foam material considered and the manufacturing process are described in the international patent applications WO 2004089564 and WO 2005037467 respectively. According to this process, the metal foam is produced in sheets with the desired length and width.

Foam based filters to be used or contained in said devices, are known for diesel particulate filtering applications, although most of them are based on ceramic materials. Typically ceramic foams with sufficiently small pore sizes to achieve good filtration efficiencies exhibit a relatively high pressure drop, due to the large number of closed pores. Moreover, as more soot is accumulated in the filter, such foams are known to lower their filtration efficiency until a "blow-off" behavior, i.e. a negative efficiency, is observed.

Another drawback of the ceramic foams is the limitation regarding the shaping of the final filter to be used or contained in said devices. Therefore, it is very difficult to obtain a large filtration area in the limited space required in automotive applications.

There is known a metal catalyst carrier with in use, an exhaust of an internal combustion engine, which enters exhaust pipe and enters tube passageway and flows outwardly through perforations therein, and which is diverted out by an interior closure. An annular baffle redirects the gas flow through perforations back into passageway and through a gas-permeable plug catalyst member, then flowing through a further plug catalyst member and continues to be forced into a serpentine flow path in and out of tube passageway via perforations. This path forces the exhaust into contact with exhaust pipe catalytic coating and inner catalytic coating of conformable catalyst member. Surfaces of conformable catalyst member and the inner surface of exhaust pipe may be coated with catalytic materials. The catalytically contacted gas undergoing pollution abatement reactions by contacting the catalytic coatings, emerges as a cleaned exhaust. This engine however is substantially different from the device of the subject invention.

In the known prior art, the material proposed is generally referred to as porous metal, without specifically detailing the production process.

Besides, some known embodiments are defined by the need to support the thermal regeneration of the filters via the usage of electrical heaters. Therefore the usage of at least two cylindrical filter elements is called for. Due to the limitations related with the material, the production process of the filter elements and of the need of multiple filter elements, the thickness of the filter elements is restricted in the region 0.5 to 20 mm, preferably 1 mm or more.

The pore size range proposed to be used particularly preferably from 100 to 600 μm is fairly small. Similarly the filtration thicknesses are very narrow. Besides, a simple reference to a "3-D trapping effect" lacks to demonstrate an understanding of the actual filtration mechanisms.

In further known prior art, there are two elements to be considered as fundamental consisting of the so-called "porosity gradient" principle and use of catalytically coated foam material which are not addressed.

A still further known prior art relates to the use of ceramic foams resulting in that they do not provide a gradient porosity.

AIM OF THE INVENTION

The purpose of the present invention is to remedy the aforementioned drawbacks and the application field of the present invention is targeted mainly in the area of catalytic substrates for gasoline and diesel engine exhaust after treatment.

SUMMARY OF THE INVENTION

There is thus proposed according to the present invention a device as defined in claim 1. The purpose of the present invention is thus achieved by a device of the type mentioned above in the preamble, which is remarkable in that said foam segments are separated by a diaphragm, each comprising a plurality of layers of metal foam sheets, which are set about the longitudinal axis of the shell in such a way as to define, inside the shell, an inlet chamber, an outer chamber, and an exit chamber. Said chambers communicate with said intake pipe and said outlet pipe in such a way that during use, the flow of the engine exhaust gases is forced from the inlet chamber to the outer chamber and from the outer chamber to the exit chamber, thus assuming radial components of velocity with respect to the longitudinal axis of the shell.

According to a further main embodiment of the invention, there is proposed an exhaust gas after-treatment device further comprising two secondary foam segments made of layered metal foam sheets set in the path of communication between said intake pipe and outlet pipe, in addition to the main said two foam segments. Said device is remarkable in that said two secondary foam segments also comprise a plurality of layers of metal foam sheets, which are set about the longitudinal axis of the shell in such a way as to define, inside the shell, an inner chamber, an outer chamber, an exit chamber, and a closed chamber, wherein said chambers communicate with said intake, resp. outlet pipes in such a way that during use, the flow of the engine exhaust gases is forced from the inner chamber via the outer chamber and the closed chamber to the exit chamber, thus assuming radial components of velocity with respect to the longitudinal axis of the shell.

According to an advantageous embodiment of the invention, said foam segments of said device are composed of concentric layers of metal foam sheets.

According to a further advantageous embodiment of the invention, the porosity of the metal foam layers is variable in any direction.

According to a still further advantageous embodiment of the invention, the foam segments are rolled around perforated tubes.

According to a particular embodiment of the invention, the respective diameters of said perforated tubes are different.

According to a more particular embodiment of the invention, the perforation of the perforated tubes is locally variable.

According to a preferred embodiment of the invention, the metal foam layers are coated with catalytically active material.

According to a further preferred embodiment of the invention, the catalytic loading of the metal foam layers is variable in any direction.

According to a specific embodiment of the present invention, said diaphragm has a disc shape with its external diameter assuming any value larger than the diameter of the perforated tubes and lower than the diameter of the outer shell.

According to a more specific embodiment of the present invention said diaphragm is perforated.

According to a still more specific embodiment of the present invention said perforation of diaphragm is locally variable.

According to a further embodiment of the invention, said perforated tube is closed at its one end by a disc-shaped diaphragm and at its opposite end by a disc-shaped diaphragm, thus forcing the flow of gas entering the inner chamber to pass via the outer chamber and the closed chamber to the exit chamber, which communicates with the outlet pipe.

According to a still further embodiment of the invention, each foam sheet is made of a metal alloy, with suitable mechanical properties to allow forming in tubular design.

The present invention also relates to an engine exhaust after-treatment system comprising a plurality of combinations, each including a device as set out above in serial arrangements.

Alternatively, the present invention relates to an engine exhaust after-treatment system comprising a plurality of combinations, each including a device as set out above in parallel arrangements.

Still alternatively the present invention relates to an engine exhaust after-treatment system comprising a plurality of combinations, each including a device as set out above in both serial, resp. parallel arrangements.

According to a specific embodiment, the system according to the present invention further comprises a conduit having a cavity defined by an inner surface and wherein each combination is received in the cavity.

The metal foam offers a high specific surface area for application of catalytic coatings. In addition, the foam structure enhances the gas mixing and mass transfer rates between the gas and the catalytic surface. An additional property of the metal foam as catalyst substrate is its potential to filter particulate matter from the exhaust gas, which is important in the case of diesel and direct injection gasoline engines. Due to the above properties, the metal foam presents advantages compared to the widely used honeycomb substrates. On the other hand, the flow resistance of metal foams depends strongly on their internal structure. To obtain acceptable pressure drop with a foam substrate, it is necessary to optimize both the microstructure—e.g. pore size—and the macro-structure, e.g. external geometry. The present invention addresses the issue of such a design optimization.

The pressure drop can be reduced by lowering the gas velocities, which is possible by a large cross-section area. A large cross-section area can be obtained if the foam is shaped in a tubular configuration in such a way as to be radially traversed by the exhaust gas flow. This is technically possible in the case of the metal foam considered in the present invention.

In some applications the primary requirement is that the exhaust aftertreatment device shall not block the engine by exerting an extremely high backpressure. Such high backpressure will occur in any filter accumulating soot with high efficiency and operating under low temperature conditions (100-250° C.), typically met in urban driving. One possibility to avoid this is to use foams that exhibit a decreasing filtration efficiency as soot loading increases. Such a device will tend to equilibrate ("zero efficiency") at an acceptable backpressure level for the engine. Using a carefully selected combination of foam porosities, it is possible to design the device in such a way as to reach the aforementioned target.

Depending on the application, the metal foams can be coated with any catalytically active material. Possible applications cover diesel oxidation catalysts, "3-way" catalysts, lean NOx catalysts and traps, NOx Selective Catalytic Reduction. The catalytic coating could also be used to enhance the oxidation rate of the accumulated soot in filtration devices.

The purpose of the invention is accomplished based on a tubular design, where the flow is forced to pass through in the transverse direction several times, using diaphragms to guide the flow. The specific design makes maximum use of the available—usually restricted—volume in such a way as to achieve a good compromise between low gas velocity, sufficient filtration depth and acceptable backpressure.

A large filtration area could be obtained if the filter is shaped in a tubular configuration in such a way as to be radially traversed by the exhaust gas flow. This is technically possible in the case of the metal foam to be considered in the device according to the present invention.

In an alternative embodiment, an additional (secondary) foam tube is placed within the metal support of the primary foam segment. The diaphragms are designed in such a way as to allow the flow to be divided between the main and the secondary foam segment according to the respective flow resistances. This configuration further increases the flow area for a given available volume, providing additional pressure drop benefits. This may be done with a compromise in the overall foam thickness. The resulting adverse effect on filtration efficiency could be minimized by appropriate selection of the foam porosity.

The pore size of the foam may vary in the range between 400 and 1800 microns. The thickness of each foam sheet is approximately 1.5 mm for the lowest pore sizes and approximately 4 mm for the largest pore sizes. This foam can be easily shaped to form cylindrical structures by rolling. Moreover, the foam can be easily coated with catalytically active materials typically used in automotive applications. Further features of the present invention are set out in additional sub-claims.

Unlike most commercialized diesel particulate filters, which work based on the surface filtration mechanism, foam filters operate based on deep-bed filtration. This means that the soot is collected within the foam structure rather than on its surface. Based on current experience based on engine testing, a highly efficient filter with small pores will tend to accumulate much more soot near its entrance rather than towards its exit. This non-uniform soot distribution is not favorable since the highly-loaded regions of the filter will increase the pressure drop non-proportionally. On the other hand, a more uniform distribution can be accomplished using a combination of various foam structures, with larger pores near the entrance and progressively smaller pores near the exit. This configuration referred to as "porosity gradient" is technically feasible with the metal foam material considered here, which is not the case for ceramic foams.

Real-world testing so far has shown that a deep-bed based particulate filtration efficiency of the order of 80 to 95% is possible with acceptable pressure drop using a coated foam filter appropriately shaped to allow flow direction in a radial direction. Due to the governing diffusion-based filtration mechanism, the filtration efficiency is highest (close to 100%)

for the smaller particle sizes (<20 nm). It is assessed that the soot capacity limit of the filter may exceed 15 grams/liter, which is almost double compared to standard wall-flow systems. The regeneration potential of this filter at low temperatures (between 250-450° C.) has proven to be superior compared to standard catalyzed ceramic wall-flow filters. The catalytic coating is also able to attain a near 100% conversion of CO and hydrocarbons at temperatures of the order of 200° C. At the same time, the foam based filters with pore size of 600 microns or less exhibit no tendency for blowing-off the accumulated soot during any possible realistic driving condition.

Some exemplary embodiments of the device according to the present invention are further described more in detail in the description hereafter, which are further illustrated by the appended drawings, wherein same numerals refer to similar or identical elements.

DESCRIPTION

Figure 1:
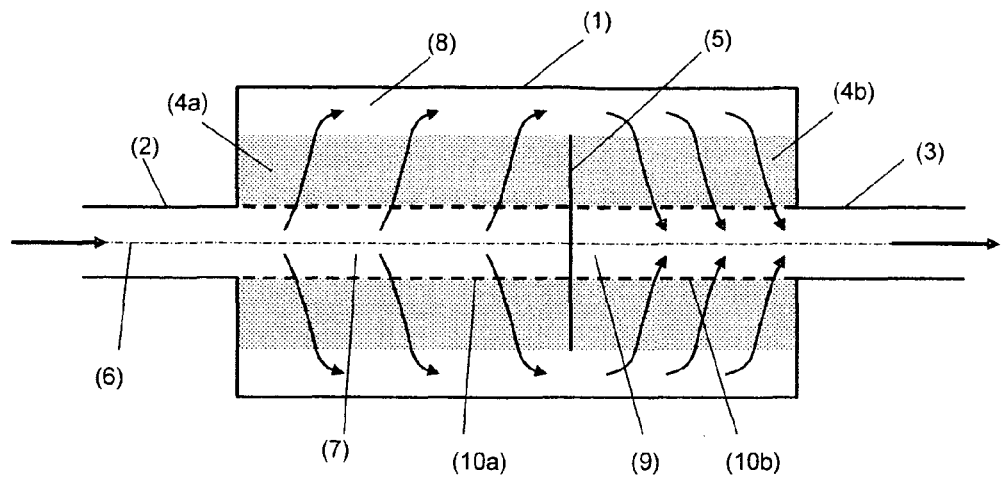
FIG. 1 illustrates a first embodiment of the invention.

FIG. 1 shows a device which includes two foam segments 4a and 4b where the exhaust flows from the inlet chamber 7 to the outer chamber 8 and from the outer chamber 8 to the exit chamber 9.

Figure 2:
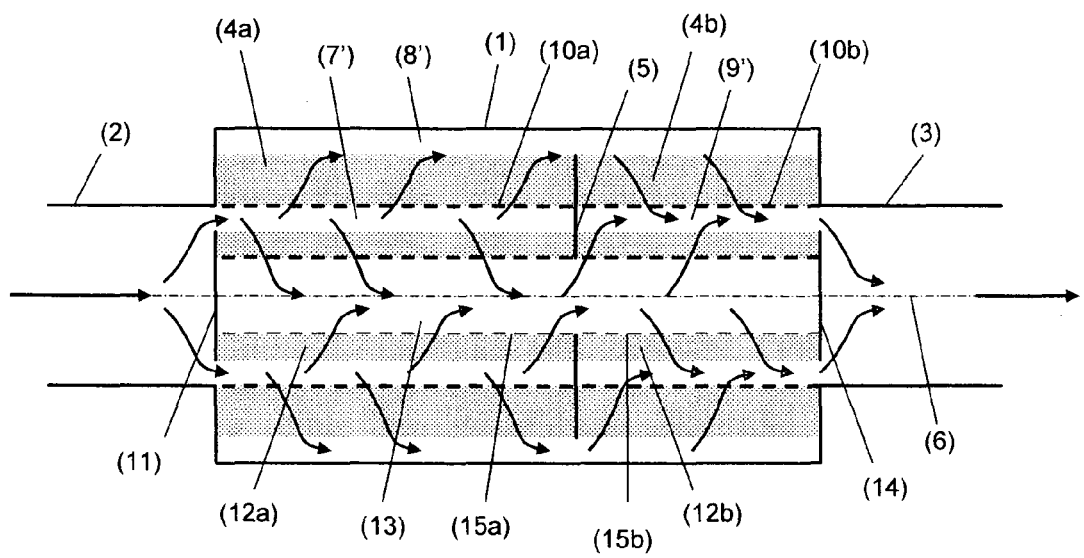
FIG. 2 illustrates a second embodiment of the invention.

FIG. 2 shows a device which includes two foam segments 4a and 4b where the exhaust is forced to flow from the inner chamber 7' via the outer chamber 8' and the closed chamber 13 to the exit chamber 9'.

Figure 3:
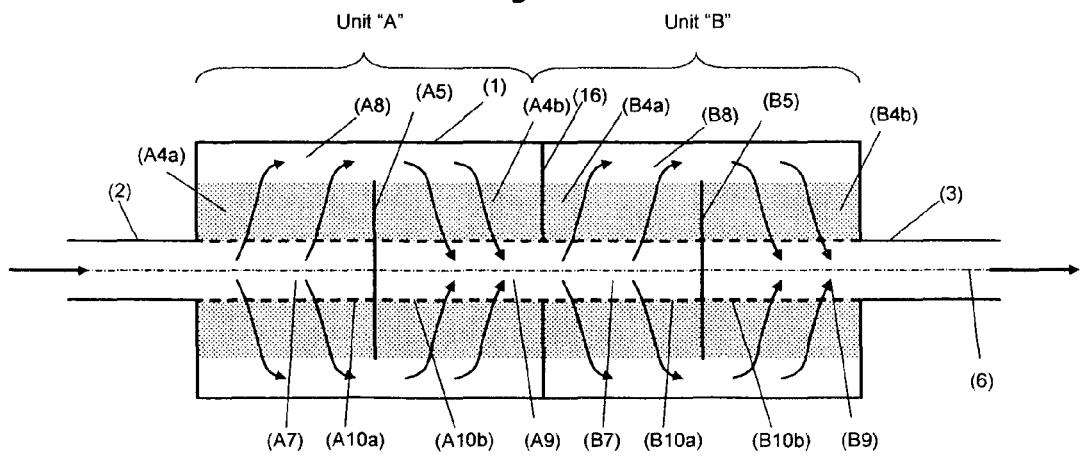
FIG. 3 illustrates a third embodiment of the invention.

FIG. 3 shows a device which includes two units assembled in series and sharing a common diaphragm 16. Each unit resembles the embodiment described in FIG. 1. Unit "A" shares a common diaphragm 16 with Unit "B", thus forcing the flow exiting Unit "A" via the exit chamber A9 to enter directly the inlet chamber B7 of Unit "B". The flow is then forced via the outer chamber B8 and the exit chamber B9 to the outlet pipe 3.

Figure 4:
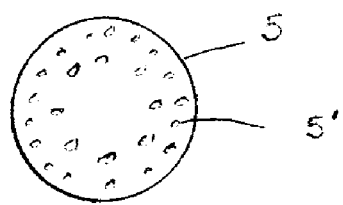

FIG. 4 shows a perforated diaphragm.

Similar to the embodiment described in FIG. 3, further possible embodiments are possible by assembling more than two units in series and/or in parallel.

With reference to FIG. 1, number 1 designates the metal shell, defining a cavity with an intake pipe 2 and an outlet pipe 3 and two foam segments 4a, 4b made of layered metal foam sheets set in the path of communication between said intake pipe 2 and outlet pipe 3.

In FIG. 1, the foam segments 4a, 4b comprise a plurality of metal foam sheets, rolled around perforated tubes 10a, 10b, with a porosity preferably higher than 40%.

The foam segments 4a and 4b are separated by a diaphragm 5 and are set about the longitudinal axis 6 of the shell 1 in such a way as to define, inside the shell 1, an inlet chamber 7, an outer chamber 8, and an exit chamber 9, the said chambers communicating with said intake pipe 2 and said outlet pipe 3 in such a way that during use, the flow of the engine exhaust gases is forced from the inlet chamber 7 to the outer chamber 8 and from the outer chamber 8 to the exit chamber 9, thus assuming radial components of velocity with respect to the longitudinal axis 6 of the shell 1. The porosity of the foam layers is preferably variable. To minimize pressure drop the layers near the perforated tubes should preferably have larger pores and the layers close to the periphery should preferably have smaller pores.

In most applications the foam material is catalytically coated. The type and amount of catalytic coating depends on the specific application. An important feature of the present device is the possibility of combining different catalytic functionalities in one system, by using different types and/or amounts of catalytic coatings in different foam layers. In addition, the foam may act at the same time as a particulate filtering device.

According to a more specific embodiment of the present invention said diaphragm 5 is perforated 5' with a plurality of perforations as shown in FIG. 4. According to a still more specific embodiment of the present invention said perforations 5' of diaphragm 5 are locally variable.

In the variation of the design shown in FIG. 2, the foam segments 4a, 4b, 12a, 12b are set about the longitudinal axis 6 of the shell 1 in such a way as to define, inside the shell 1, an inner chamber 7, an outer chamber 8, an exit chamber 9, and a closed chamber 13, the said chambers communicating with said intake pipe 2 and said outlet pipe 3 in such a way that during use, the flow of the engine exhaust gases is forced from the inner chamber 7 via the outer chamber 8 and the closed chamber 13 to the exit chamber 9, thus assuming radial components of velocity with respect to the longitudinal axis 6 of the shell 1.

This design achieves a higher flow cross-section area for the same overall volume with a compromise in filtration depth. The exhaust flow is distributed between the primary and the secondary foam segments according to the respective flow resistances. The inner and outer dimensions of the main and secondary foam segments can be appropriately designed to achieve the preferred flow distribution, taking into account filtration and pressure drop requirements. As regards the porosity of the foams and the catalyst distribution, the same considerations apply as already mentioned in the case of FIG. 1.

In the variation of the design shown in FIG. 3, two units are assembled in series, sharing a common diaphragm 16. Unit "A" comprises two foam segments A4a and A4b separated by a diaphragm A5, the said foam segments being set about the longitudinal axis 6 of the shell 1 in such a way as to define, inside the shell 1, an inlet chamber A7, an outer chamber A8, and an exit chamber A9. Unit "B" comprises two foam segments B4a and B4b separated by a diaphragm B5, the said foam segments being set about the longitudinal axis 6 of the shell 1 in such a way as to define, inside the shell 1, an inlet chamber B7, an outer chamber B8, and an exit chamber B9.

The flow of the engine exhaust gases entering Unit "A" via the intake pipe 2 is forced from the inner chamber A7 via the outer chamber A8 to the exit chamber A9, thus assuming radial components of velocity with respect to the longitudinal axis 6 of the shell 1. Unit "A" shares a common diaphragm 16 with Unit "B", thus forcing the flow exiting Unit "A" via the exit chamber A9 to enter directly the inlet chamber B7 of Unit "B". The flow is then forced via the outer chamber B8 and the exit chamber B9 to the outlet pipe 3, thus assuming radial components of velocity with respect to the longitudinal axis 6 of the shell 1.

The invention claimed is:

1. An exhaust gas after-treatment device, comprising a metal shell (1) defining a cavity with an intake pipe (2) and an outlet pipe (3) and two foam segments (4a; 4b) made of layered metal foam sheets set in the path of communication between said intake pipe (2) and outlet pipe (3), wherein said foam segments (4a) and (4b) are separated by a perforated diaphragm (5) wherein the diaphragm has a plurality of perforations and wherein the perforations thereof (5) may be locally variable, each foam segment comprising a plurality of layers of metal foam sheets, which are set about the longitudinal axis (6) of the shell (1) in such a way as to define, inside the shell (1), an inlet chamber (7), an outer chamber (8), and an exit chamber (9), the said chambers communicating with said intake pipe (2) and said outlet pipe (3) in such a way that during use, the flow of the engine exhaust gases is forced from the inlet chamber (7) to the outer chamber (8) and from the outer chamber (8) to the exit chamber (9), thus assuming radial components of velocity with respect to the longitudinal axis (6) of the shell (1).

2. The device according to claim 1, wherein said foam segments (4a; 4b) are composed of concentric layers of metal foam sheets.

3. The device according to claim 2, wherein the porosity of the metal foam layers is variable in any direction.

4. The device according to claim 2, wherein the foam segments (4a; 4b) are rolled around perforated tubes (10a; 10b), wherein the respective diameters of said perforated tubes (10a) and (10b) may be different, and wherein the perforation thereof (10a) and (10b) may be locally variable.

5. The device according to claim 2, wherein the metal foam layers are coated with catalytically active material.

6. The device according to the preceding claim 5, wherein the catalytic loading of the metal foam layers is variable in any direction.

7. The device according to claim 2, wherein said diaphragm (5) has a disc shape with its external diameter assuming any value larger than the diameter of the perforated tubes (10a) and (10b) and lower than the diameter of the outer shell (1).

8. The device according to claim 2, wherein each foam sheet is made of a metal alloy, with suitable mechanical properties to allow forming in tubular design.

9. An engine exhaust after-treatment system comprising a plurality of combinations, and wherein each combination includes a. device according to claim 2 in serial and/or parallel arrangements.

10. An exhaust gas after-treatment device, comprising a metal shell (1) defining a cavity with an intake pipe (2) and an outlet pipe (3), two main foam segments (4a; 4b) and two secondary foam segments (12a; 12b) made of layered metal foam sheets set in the path of communication between said intake pipe (2) and outlet pipe (3), wherein said primary (4a) and (4b) and secondary foam segments (12a) and 12(b) are separated by a perforated diaphragm (5) wherein the diaphragm has a plurality of perforations and wherein the perforations thereof (5) may be locally variable, and wherein the foam segments comprise a plurality of layers of metal foam sheets, which are set about the longitudinal axis (6) of the shell (1) in such a way as to define, inside the shell (1), an inner chamber (7) located between the foam segments 4a and 12a, an outer chamber (8) located on the outside of foam segments 4a and 4b, an exit chamber (9) located between the foam segments 4b and 12b, and a closed chamber (13) located on the inside of foam segments 12a and 12b, the said chambers communicating with said intake pipe (2) and said outlet pipe (3) in such a way that during use, the flow of the engine exhaust gases is forced from the inner chamber (7) via the outer chamber (8) and the closed chamber (13) to the exit chamber (9), thus assuming radial components of velocity with respect to the longitudinal axis (6) of the shell (1).

11. The device according to claim 10, wherein the main foam segments (4a; 4b) and the secondary foam segments (12a; 12b) are composed of concentric layers of metal foam sheets.

12. The device according to claim 11, wherein the porosity of the metal foam layers is variable in any direction.

13. The device according to claim 11, wherein the metal foam layers of the main foam segments (4a, 4b) and the secondary foam segments (12a, 12b) are coated with catalytically active material, wherein the catalytic loading of the metal foam layers may be variable in any direction.

14. The device according to claim 11, wherein said diaphragm (5) has a disc shape with its external diameter assuming any value larger than the diameter of the perforated tubes (10a; 15a) and (10b; 15b) and lower than the diameter of the outer shell (1).

15. The device according to claim 11, wherein said diaphragm (5) is perforated, wherein the perforation of diaphragm (5) may be locally variable.

16. The device according to claim 11, wherein the foam segments (4a; 4b, resp. 12a; 12b) are rolled around perforated tubes (10a; 10b), respectively (15a; 15b), wherein the respective diameters of said perforated tubes (10a; 15a) and (10b; 15b) may be different and wherein the perforation of the perforated tubes (10a; 15a) and (10b; 15b) may be locally variable.

17. The device according to claim 11, wherein said perforated tube (15a) is closed at its one end by a disc-shaped diaphragm (11) and at its opposite end by a disc-shaped diaphragm (14) thus forcing the flow of gas entering the inner chamber (7) to pass via the outer chamber (8) and the closed chamber (13) to the exit chamber (9), which communicates with the outlet pipe (3).

18. The device according to claim 11, wherein each foam sheet is made of a metal alloy, with suitable mechanical properties to allow forming in tubular design.

19. An engine exhaust after-treatment system comprising a plurality of combinations, and wherein each combination includes a device according to claim 11 in serial and/or parallel arrangements.

20. The system as set forth in claim 19 further comprising a conduit having a cavity defined by an inner surface wherein each combination is received in the cavity.

* * * * *